United States Patent
Blommendaal

[15] 3,670,332
[45] June 13, 1972

[54] DIRECTION FINDING DEVICE

[72] Inventor: Ronald Blommendaal, Noordwijk, Netherlands

[73] Assignee: Christiaan Huygenslaboratorium N. V., Noordwijk, Netherlands

[22] Filed: Sept. 10, 1969

[21] Appl. No.: 856,859

[30] Foreign Application Priority Data

Sept. 19, 1968 Netherlands..........................6812918

[52] U.S. Cl..........................343/16 R, 343/16 M, 343/113, 343/725
[51] Int. Cl...........................................................G01s 9/02
[58] Field of Search.........................343/16, 165 D, 113, 725

[56] References Cited

UNITED STATES PATENTS 3,406,393  10/1968  Kulik..................................343/16 X

*Primary Examiner*—T. H. Tubbesing
*Attorney*—Jecies and Greenside

[57] ABSTRACT

Direction finding device with a high directivity antenna with a narrow beam, and a pair of interferometer elements with a periodical radiation pattern. The signals obtained from the high directivity antenna and the interferometer elements respectively are compared in such a way, that by means of the comparison results a distinction can be made between signal sources in different sectors of the beam of the high directivity antenna.

6 Claims, 4 Drawing Figures

DIRECTION FINDING DEVICE

The invention relates to a direction finding device with a high directivity antenna having a narrow beam whose maximum power lies along the axis about which the beam is symmetrical, as well as a device connected thereto that indicates a target as soon as the amplitude of the signal from the high directivity antenna exceeds a threshold value.

Such direction finding devices are often used for determining the direction of active targets, which themselves radiate a signal, or passive targets, which merely reflect a radiated signal. In general, the accuracy of the direction determination is higher as the beam width is smaller. This beam width is determined by the size of the high directivity antenna as compared with the wave length, and the way in which the high directivity antenna is excited. In general:

$$\Delta\Theta_{+3db} = K\lambda/D,$$

in which $\lambda$ is the wave length, $D$ is the antenna size, $\Delta\Theta_{+3db}$ is the angle between the directions on both sides of the main axis, in which the power is 3db lower than the power in the direction of the main axis and $K$ depends upon the phase distribution and amplitude distribution for the excitation of the antenna. With a uniform excitation of the high directivity antenna over its entire size, $K = 50.4°$ and for an antenna of which the edges are excited so much weaker than the center, that the side lobes are 27 db weaker than the main lobes, $K$ is approximately 62°.

The direction in which a target is present can be determined with high accuracy by investigating in which positions of the high directivity antenna the received power has fallen to one half of the maximum receivable power. The target is then present in the direction which the main axis indicates at the mean of these two positions. It is a disadvantage of this method, that a considerable time must be available for the measurement, while the antenna movement is determined by this measurement, so that it is impossible to scan the space during the measurement. It is also a disadvantage that the received power is subject to fluctuations of various kinds, which can influence the accuracy of measurement deleteriously.

Another possibility is, to determine how the strength of the received signal varies upon the target passing through the direction finding beam. From this variation the observer, in applicable cases with electrical means, may determine a center of the received signals, which then accurately indicates the direction of the target. However, it is a disadvantage of this method, that the result of the measurement becomes known only after the target has passed through the entire beam. Moreover, sufficient signals must occur during the passage through the beam, which necessitates a high pulse repetition frequency with pulse radar or a low rotation speed of the high directivity antenna, while random fluctuations of the strength of the received signal may also impair the accuracy of this measuring method.

The invention aims at providing a direction finding device of the kind referred to hereinabove, which makes possible an accurate measurement as soon as the target is present in a central part of the main beam, without it being necessary to influence the movement of the high directivity antenna for the purpose of the measurement, and in which the measuring result becomes immediately available.

For that purpose, a device according to the invention is characterized by an interferometer antenna mechanically coupled with the high directivity antenna, as well as a further device which from the interferometer antenna and hybrid means connected thereto derives an interferometer signal which is a periodic function of the angle between the direction of the radiation source and the main axis, which further device comprises (a) phase detecting means for detecting the signal from the high directivity antenna as well as the interferometer signal phase-dependently with a coherent signal and (b) comparison mean for comparing the detection products with reference signals for, generating an output code of which a first digit has a first value if the detected signal from the high directivity antenna is stronger than the related reference signal, or has a second value if this is not the case, while a second digit has a first value if the detected interferometer signal is stronger than the related reference signal and has the same polarity, or has a second value if one or both conditions are not met, and a third digit has a first value if the interferometer signal is stronger than the related reference signal and has the opposite polarity, or has a second value if one or both conditions are not met.

In this way, one obtains output codes dependent upon the direction with respect to the main axis, for targets which are present in a central part of the main beam of the high directivity antenna, and these output codes do not occur for targets that are present outside the central part of the main beam of the high directivity antenna, so that different directions within a central part of the main beam can be distinguished from one another. The accuracy with which the direction of a target can be determined is for that reason much better than would appear from the beam width of the high directivity antenna.

The invention will be further elucidated below with reference to the drawing, which relates to some practical embodiments of a device according to the invention.

Figure 1:
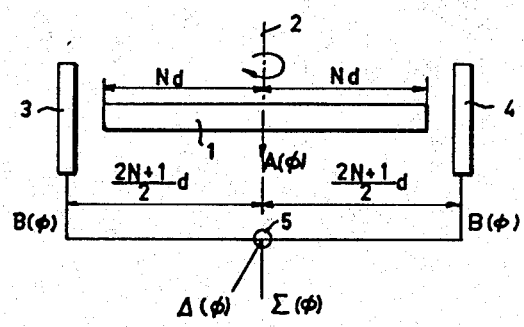
FIG. 1 is a schematic representation of an antenna system according to the invention.

For the description, reference shall be had to a high directivity antenna with a radiation pattern $A(\Phi)$, in which:

$$\Phi = (2\pi d/\lambda)\sin\Theta,$$

in which $\lambda$ is the wave length, $\Theta$ is the angle between the target direction and the main axis of the high directivity antenna and $d$ is the spacing of the radiators. It has been assumed in that connection that the high directivity antenna consists of $2N + 1$ radiators arranged with mutually equal spacings along a straight line. In practice, it is not necessary to use a high directivity antenna constructed of separate radiators, and radiating horns e.g., with or without a beam shaping reflector, can also be used. However, such antennas with continuous excitation can also be considered as ensembles of separate radiators. The high directivity antenna is shown at 1 in FIG. 1 and its rotation axis is shown at 2, the main axis in this case being at right angles to the plane of representation and passing through the intersection of the center line of the high directivity antenna 1 and its rotation axis 2.

On both sides of the high directivity antenna 1, radiators 3 and 4 are arranged, which together constitute an interferometer. As will be apparent from the disclosure which follows, in some circumstances it may be advantageous to use a single radiator for which reason radiator 3 and its connection to the hybrid circuit 5; e.g., a magic T, has been drawn in phantom lines. Each of these radiators exhibits a radiation pattern $B(\Phi)$ and it is assumed that the distance of their phase center to the rotation axis equals $$\left(\frac{2N+1}{2}\right)d.$$

The two radiators 3 and 4 of the interferometer are connected to the hybrid circuit 5, which provides the sum signal $\Sigma(\Phi)$ as well as the difference signal $\Delta(\Phi)$ of the output signals of the interferometer radiators 3 and 4. These signals can be described as $$\Sigma(\Phi) = B(\Phi) \times \cos\left\{\left(\frac{2N+1}{2}\right)\Phi\right\}$$

$$\Delta(\Phi) = B(\Phi) \times \sin\left\{\left(\frac{2N+1}{2}\right)\Phi\right\}$$

in which the variation of the high frequency signals with time has been disregarded.

With mutually equal excitation of the radiators of the high directivity antenna 1, its radiation pattern can be described as $$A(\Phi) = \frac{\sin\left\{\left(\frac{2N+1}{2}\right)\Phi\right\}}{\sin\frac{\Phi}{2}}$$

The first nulls of the radiation pattern are at angles $$\left(\frac{2N+1}{2}\right)\Phi = \pm\pi$$

on both sides of the main axis, that is at a mutual angular spacing for which $$\left(\frac{2N+1}{2}\right)\Phi = 2\pi$$

The nulls of the sum signal $\Sigma$ and the difference signal $\Delta$ of the interferometer antenna, however, occur with a period $\pi$ for $$\left(\frac{2N+1}{2}\right)\Phi,$$

so that these are located twice as closely as the nulls of the output signal $A(\Phi)$ of the high directivity antenna. If one should use a high directivity antenna of which the outer radiators are excited only weakly, the first nulls of the main beam $A(\Phi)$ of the high directivity antenna are even at such a distance from each other, that $$\left(\frac{2N+1}{2}\right)\Phi = 3\pi.$$

By means of the nulls of the sum signal $\Sigma$ and the difference signal $\Delta$ of the interferometer antenna and the mutual phase of the three signals $A(\Phi)$, $\Sigma(\Phi)$ and $\Delta(\Phi)$, the angle between the target direction and the main axis 2 can be determined in various ways. The three signals referred to can be described as $$A(\Phi,t) = A(\Phi) \times \cos\omega t$$

$$\Sigma(\Phi,t) = B(\Phi) \times \cos\left\{\left(\frac{2N+1}{2}\right)\Phi\right\} \times \cos(\omega t + \Psi)$$

$$\Delta(\Phi,t) = B(\Phi) \times \sin\left\{\left(\frac{2N+1}{2}\right)\Phi\right\} \times \cos(\omega t + \xi)$$

Therein, $\psi$ and $\xi$ are the phase differences of the signals $\Sigma(\Phi, t)$ and $\Delta(\Phi, t)$ respectively, with respect to the signal $A(\Phi, t)$. By means of phase shifters or delay devices, these phase differences can always be reduced to zero, for which reason they are indeed assumed to be zero in what follows.

If the signals $\Sigma(\Phi,t)$ and $\Delta(\Phi,t)$ respectively are phase-detected by known phasedetector means 6 with a reference signal (which e.g. as shown is an antenna derived signal) in which case the detection products, represented by $\Sigma'(\Phi)$ and $\Delta'(\Phi)$ respectively, can be written as $$\Sigma'(\Phi) = B(\Phi) \times \cos\left\{\left(\frac{2N+1}{2}\right)\Phi\right\}$$

$$\Delta'(\Phi) = B(\Phi) \times \sin\left\{\left(\frac{2N+1}{2}\right)\Phi\right\}$$

Figure 4:
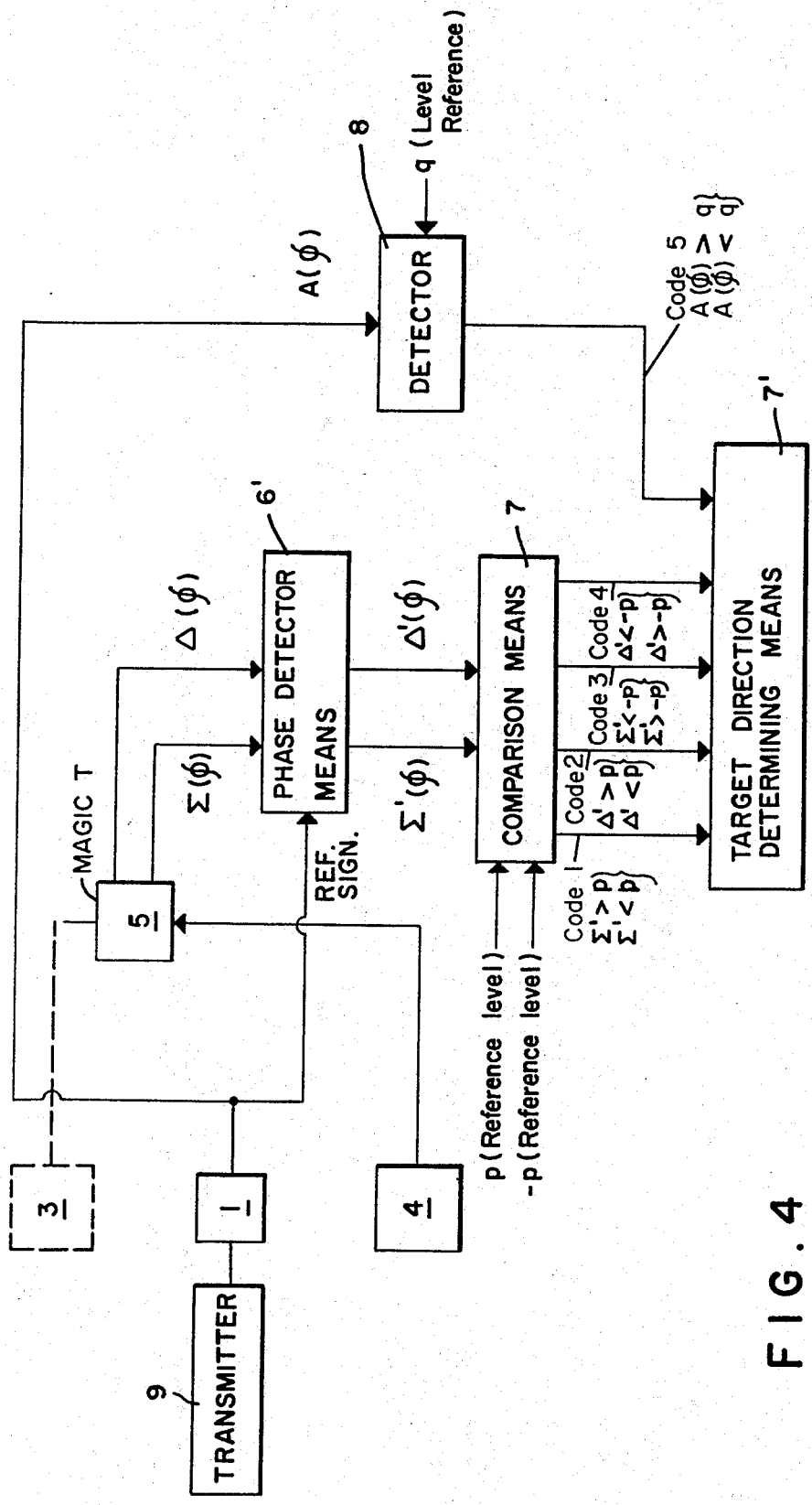
FIG. 4 is a block diagram of the several components of the direction finding device of the invention.

By determining the sign of the detection products $\Sigma'(\Phi)$ and $\Delta'(\Phi)$ respectively and moreover determining by suitable comparison means 7 whether these detection products in the absolute sense exceed a threshold value $p = \cos\alpha$ the four code digits shown in FIG. 4 can be generated:

1) $\Sigma' > p \rightarrow$ code 1
   this occurs for:
   $\pm n2\pi - \alpha < \frac{2N+1}{2}\Phi < \alpha \pm 2n\pi$, in which $n$ is an arbitrary integer number;
   $\Sigma' < p \rightarrow$ code 0
   this occurs for:
   $\pm n2\pi + \alpha < \frac{2N+1}{2}\Phi < 2\pi - \alpha \pm n2\pi$, in which $n$ is an arbitrary integer number;

2) $\Delta' > p \rightarrow$ code 1
   $\pm n2\pi + \frac{\pi}{2} - \alpha < \frac{2N+1}{2}\Phi < \frac{\pi}{2} + \alpha \pm n2\pi$, in which $n$ is an arbitrary integer number,
   $\Delta' < p \rightarrow$ code 0
   this occurs for:
   $\pm n2\pi + \frac{\pi}{2} + \alpha < \frac{2N+1}{2}\Phi < \frac{5}{2}\pi - \alpha \pm n2\pi$, in which $n$ is an arbitrary integer number;

3) $\Sigma' < -p \rightarrow$ code 1
   this occurs for:
   $\pm n2\pi + \pi - \alpha < \frac{2N+1}{2}\Phi < \pi + \alpha \pm n2\pi$, in which $n$ is an arbitrary integer number,
   $\Sigma' > -p \rightarrow$ code 0
   $\pm n2\pi + \pi + \alpha < \frac{2N+1}{2}\Phi < 3\Pi - \alpha \pm n2\pi$, in which $n$ is an arbitrary integer number;

4) $\Delta' < -p \rightarrow$ code 1
   this occurs for:
   $\pm n2\pi - \frac{\pi}{2} - \alpha < \frac{2N+1}{2}\Phi < \frac{\pi}{2} + \alpha \pm n2\pi$, in which $n$ is an arbitrary integer number,
   $\Delta' > -p \rightarrow$ code 0
   this occurs for:
   $\pm n2\pi - \frac{\pi}{2} + \alpha < \frac{2N+1}{2}\Phi < \frac{3}{2}\pi - \alpha \pm n2\pi$, in which $n$ is an arbitrary integer number.

The circuitry for generating the code signals 1, 0 can consist of what is termed in the art as level discriminator, Schmitt trigger employing, circuits which as known per se, require only that they generate a logical 1 if the input signal exceeds a reference level and a logical zero if the input signal is less than the reference signal.

Figure 2:
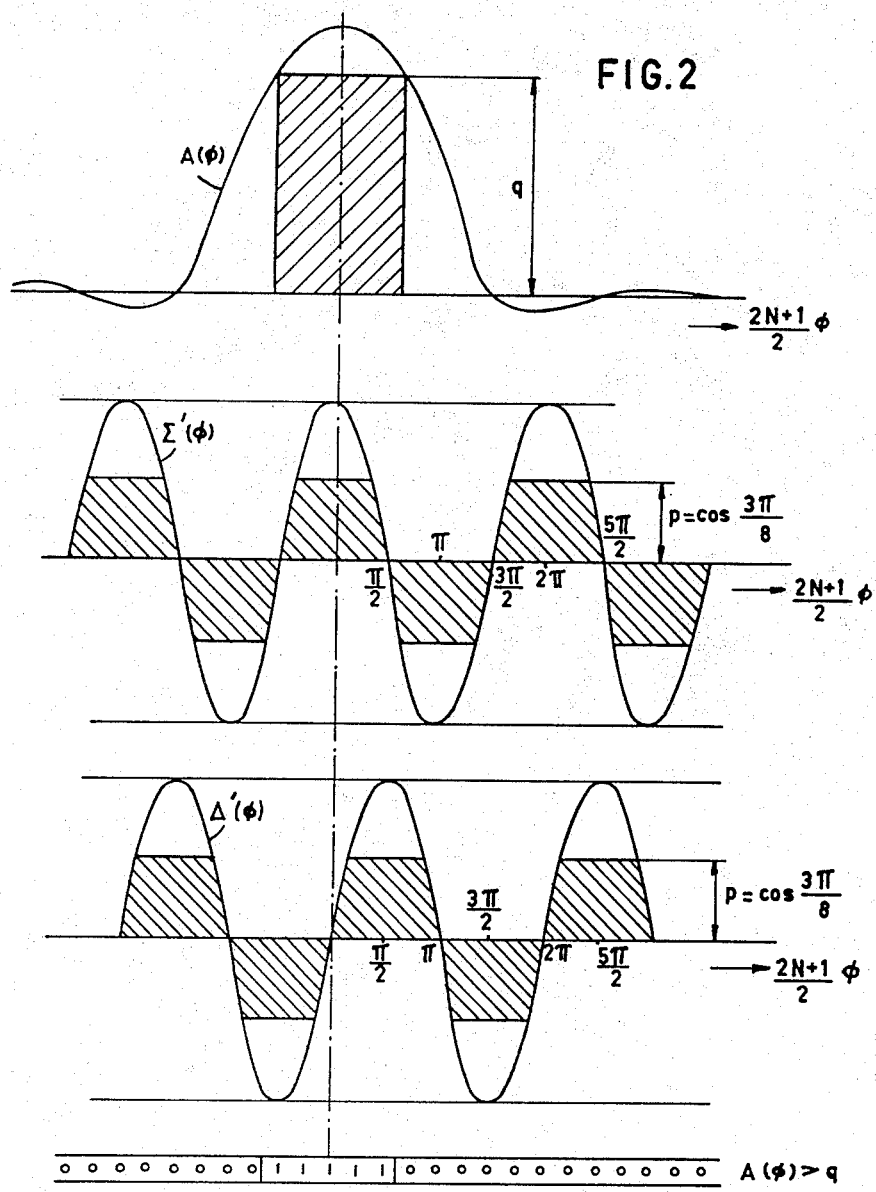
FIG. 2 is a diagram of a radiation pattern of the high directivity antenna and of the variation of the phase-detected interferometer signals as function of the angle between the direction of the target and the main axis, as well as of the output codes generated thereby, if the reference signals for the comparison are constant signals.

In FIG. 2 the result thereof is shown for $p = \cos(3/8)\pi$, the separate code digits being shown in a table below the diagrams. As shown in FIG. 4, the signal $A(\Phi)$ of the high directivity antenna by means of an individual reference signals $q$ is by detector 8 converted into a separate code digit that equals 1 as long as the signal $A(\Phi)$ is stronger than the threshold value $q$, and equals 0 as long as the signal $A(\Phi)$ is weaker than the threshold value $q$. The code consisting of the code digits which are generated by means of the signals $\Sigma'$ and $\Delta'$ repeat with a period $2\pi$ of the magnitude $$\frac{2N+1}{2}\Phi.$$

The four code digits which are generated by means of the detection products $\Sigma'$ and $\Delta'$ can be made unambiguous in an angular interval on both sides of the main axis, by adding the digit generated by means of the signal $A(\Phi)$ as a further code digit. In FIG. 2, the radiation pattern $A(\Phi)$ of a high directivity antenna with such amplitude that the side lobes are 27 dB below the main beam, is shown. The criterion $q$ for the code digit relating to the high directivity signal $A(\Phi)$ in this case is chosen in such a way that this code digit equals 1 over the central angular interval on both sides of the main axis, which exactly comprises five different code combinations of the remaining four digits. From the figure it will be seen that these five combinations of five code digits are unambiguous, since they do not occur anywhere else.

The beam width of the high directivity antenna for an excitation according to $0.22 + \cos^2$ amounts to $$\Delta\Phi_{-3dB} = \frac{2}{2N+1} \times 1.2\,\pi,$$

while the width of the separate angular segments in which a constant code occurs amounts only to $$\frac{2}{2N+1} + \frac{\pi}{4}.$$

By means of these code intervals, the directions of the target with respect to the main axis can therefore be determined 4.8 times as accurate as would follow from the beam width of the high directivity antenna.

Figure 3:
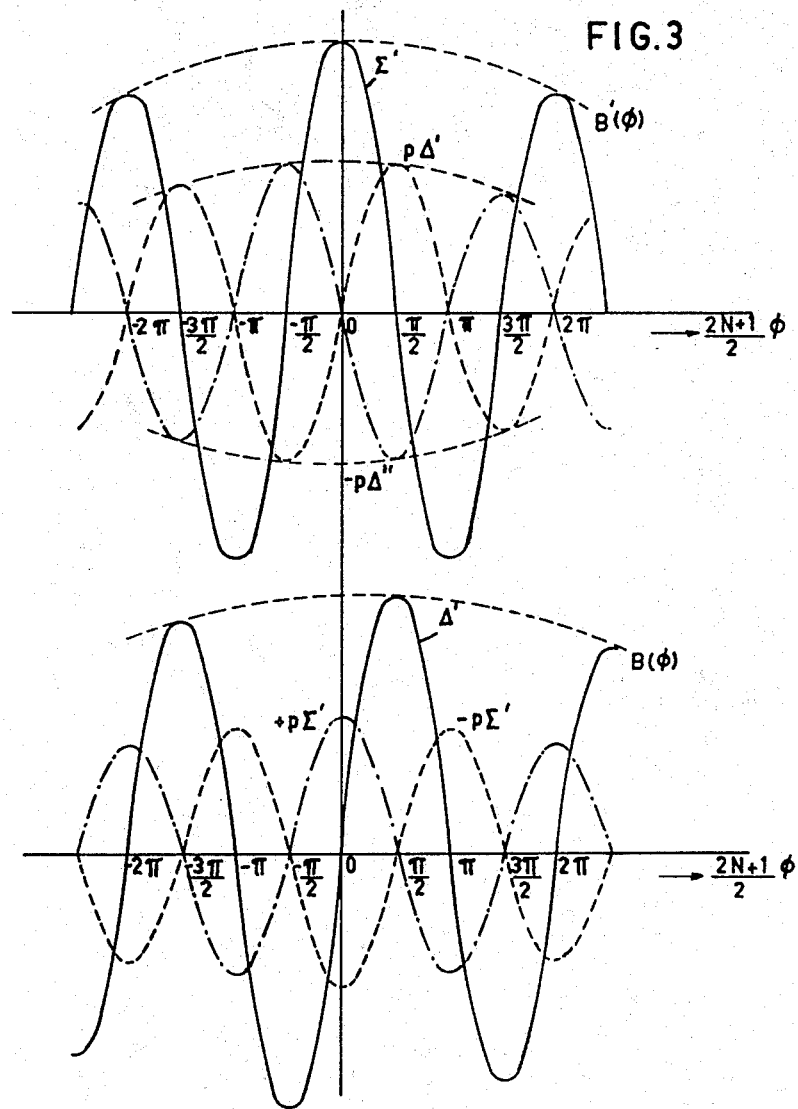
FIG. 3 is a representation of the variation of the phase-detected interferometer signals as function of the angle between the target direction and the main axis, if constant fractions of the interferometer signals are used as reference signals for the comparison, as well as of the output codes obtained in this way.

In FIG. 3, the central angular interval around the main axis in which the five unambiguous code combinations occur, is shown at 6.

The above described system has the disadvantage, that the generated code digits depends upon the strength of the received signals, for which reason an automatic level control of the received signals is necessary for suppressing the influence of the signal strength on the generated code combinations. This can be obviated by comparing the various signals not with fixed reference signals, but with one another. In that case too, code combinations can be generated which in a central interval are unambiguous. Below, the criteria to be applied for that purpose have been indicated:

1) $B(\Phi) \times \cos\left\{\left(\frac{2N+1}{2}\right)\Phi\right\} > p \times B(\Phi) \times \sin\left\{\left(\frac{2N+1}{2}\right)\Phi\right\} \rightarrow$ code 1

$B(\Phi) \times \cos\left\{\left(\frac{2N+1}{2}\right)\Phi\right\} < p \times B(\Phi) \times \sin\left\{\left(\frac{2N+1}{2}\right)\Phi\right\} \rightarrow$ code 0

2) $B(\Phi) \times \cos\left\{\left(\frac{2N+1}{2}\right)\Phi\right\} > -p \times B(\Phi) \times \sin\left\{\left(\frac{2N+1}{2}\right)\Phi\right\} \rightarrow$ code 1

$B(\Phi) \times \cos\left\{\left(\frac{2N+1}{2}\right)\Phi\right\} < -p \times B(\Phi) \times \sin\left\{\left(\frac{2N+1}{2}\right)\Phi\right\} \rightarrow$ code 0

3) $B(\Phi) \times \sin\left\{\left(\frac{2N+1}{2}\right)\Phi\right\} > p \times B(\Phi) \times \cos\left\{\left(\frac{2N+1}{2}\right)\Phi\right\} \rightarrow$ code 1

$B(\Phi) \times \sin\left\{\left(\frac{2N+1}{2}\right)\Phi\right\} < p \times B(\Phi) \times \cos\left\{\left(\frac{2N+1}{2}\right)\Phi\right\} \rightarrow$ code 0

4) $B(\Phi) \times \sin\left\{\left(\frac{2N+1}{2}\right)\Phi\right\} > -p \times B(\Phi) \times \cos\left\{\left(\frac{2N+1}{2}\right)\Phi\right\} \rightarrow$ code 1

$B(\Phi) \times \sin\left\{\left(\frac{2N+1}{2}\right)\Phi\right\} < -p \times B(\Phi) \times \cos\left\{\left(\frac{2N+1}{2}\right)\Phi\right\} \rightarrow$ code 0

For $p = \cos(3/8)\pi$, one obtains angular intervals of $(\pi/4)$ for the magnitude $$\left(\frac{2N+1}{2}\right) d.$$

each of which has an individual code of five digits. In this case too, the five central angular intervals have unambiguous code combinations.

Of course, the above described devices can be simplified and elaborated respectively, by choosing the number of criteria smaller or larger respectively and by introducing a corresponding number of factors.

If a device according to the application is intended for determining the direction of passive targets, a transmitter 9 for irradiating the targets may be connected to the high directivity antenna. It is to be understood that when transmitting only the high directivity antenna is used, while for reception, the high directivity antenna as well as the interferometer antenna means are used.

If the phase center of the high directivity antenna and the interferometer antenna are spaced, one of the radiators of the interferometer antenna can be discarded by virtue of the phase detection. Of course, this is a simplification. However, the resulting aerodynamic asymmetry caused thereby is a disadvantage. Also, it can be a disadvantage that the device in that case is more sensitive for phase differences and delay differences between the interferometer antenna and the phase-detectors, which may caused e.g. by frequency variations.

It should be pointed out, that a device according to the application not only makes it possible to direct the high directivity antenna with greater accuracy to the target, but also accurately to determine the target direction if this deviates slightly from the main axis direction, provided that the target direction is still within the central angular interval of the five unambiguous code combinations of the above examples.

If the latter possibility is not required, a very simple embodiment may be used, in which the signals $\Sigma(\Phi)$ and $\Delta(\Phi)$ are phase-detected with the signal $A(\Phi)$.

In that case, signals of the following form are obtained:

$$\Sigma''(\Phi) = A(\Phi) \times B(\Phi) \times \cos\left\{\left(\frac{2N+1}{2}\right)\Phi\right\}$$

$$\Delta''(\Phi) = A(\Phi) \times B(\Phi) \times \sin\left\{\left(\frac{2N+1}{2}\right)\Phi\right\}$$

The criteria for the generation of two code digits in that case are:

1. $p \times \Sigma''(\Phi) > \Delta''(\Phi)$    code 1
$p \times \Sigma''(\Phi) < \Delta''(\Phi)$    code 0
2. $p \times \Sigma''(\Phi) < -\Delta''(\Phi)$    code 1
$p \times \Sigma''(\Phi) > -\Delta''(\Phi)$    code 0

If the code combination (1,1) occurs, this indicates that the target is within the central angular interval. At any other target direction, a different code combination occurs.

The target direction is determined by feeding the code signals as shown in FIG. 4 to target direction determining means 7' which may be a decoder. Decoding is accomplished by circuit means known per se. For example, the circuit for decoding the central code combination (and the circuits for decoding other code combinations within the interval 6 in FIGS. 2 and 3) may comprise a simple diode matrix having five inputs for the five input signals obtained from the comparison means 7, the five outputs of the matrix accordingly denoting five different directions within the beam width.

What I claim is:

1. Direction finding device comprising a high directivity antenna having a narrow beam whose maximum power lies along a main axis about which the beam is symmetrical, interferometer antenna means mechanically coupled with said antenna for providing a beam of predetermined radiation pattern, hybrid means coupled to said interferometer antenna means for providing output sum and difference signals which are a periodic function of the angle between the direction of the radiation source and the main axis, phase detector means connected to said hybrid means for receiving said sum and difference signals therefrom and for detecting said signals with a coherent signal derived from said antenna, and comparison means for comparing the output of said phase detector with reference signals of predetermined magnitude for deriving an output code of which a first digit has a first value if said signal related to the high directivity antenna is stronger than its related reference signal, and has a second value if this is not the case, while a second digit has a first value if one of the detected further signals is stronger than its related reference signal and has the same polarity, and has a second value if one or both conditions are not met, and a third digit has a first value if another of said further signals is stronger than its related reference signal and has the opposite polarity, and has a second value if one or both conditions are not met.

2. Device according to claim 1, wherein the interferometer antenna means comprise a pair of antennas each providing a signal whose maximum power lies in different directions with respect to the main axis for each said signal.

3. Device according to claim 2, wherein the hybrid means comprises a magic T and produces from the signals provided by the interferometer means a sum signal, a maximum of which coincides with the main axis, as well as a difference signal, a null of which coincides with the main axis.

4. Device according to claim 1, wherein the interferometer antenna means comprise two radiators, one on each side of the high directivity antenna.

5. Device according to claim 1, wherein the interferometer antenna means comprises a single radiator disposed beside the high directivity antenna.

6. Device according to claim 1, wherein the high directivity antenna is connected to a transmitter.

* * * * *